(12) United States Patent
Capozio

(10) Patent No.: US 8,228,230 B1
(45) Date of Patent: Jul. 24, 2012

(54) SATELLITE ORBIT PREDICTION METHOD, RECEIVING APPARATUS AND NAVIGATION SATELLITE SYSTEM EMPLOYING THE METHOD

(75) Inventor: Piergiorgio Capozio, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 155 days.

(21) Appl. No.: 12/756,048

(22) Filed: Apr. 7, 2010

(51) Int. Cl.
*G01S 19/27* (2010.01)
(52) U.S. Cl. .................................. 342/357.66
(58) Field of Classification Search ............. 342/357.23, 342/357.25, 357.46, 357.66; 455/427, 428
See application file for complete search history.

(56) References Cited

U.S. PATENT DOCUMENTS

2008/0111738 A1   5/2008   Han

FOREIGN PATENT DOCUMENTS

| EP | 2 063 284 A2 | 5/2009 |
| WO | 2006/031652 A2 | 3/2006 |
| WO | 2008/055223 A2 | 5/2008 |
| WO | 2009/059429 A1 | 5/2009 |

*Primary Examiner* — Dao Phan
(74) *Attorney, Agent, or Firm* — Seed IP Law Group PLLC

(57) ABSTRACT

A satellite orbit prediction method of a satellite navigation system includes storing satellite past ephemerides data associated with past time intervals and satellite recent ephemeris data associated with a recent time interval, and computing reference satellite positions based on the past and recent ephemerides data. The method also includes: computing estimated satellite positions by propagating on the past time intervals using a celestial mechanics force model and the recent ephemeris data, computing errors from the reference satellite positions and estimate satellite positions, and identifying a position error function by fitting a curve to the computed errors. The position error function is used to obtain corrected predicted satellite orbit portions.

23 Claims, 4 Drawing Sheets

SATELLITE ORBIT PREDICTION METHOD, RECEIVING APPARATUS AND NAVIGATION SATELLITE SYSTEM EMPLOYING THE METHOD

BACKGROUND

1. Technical Field

The present disclosure relates to the field of global navigation satellite systems.

2. Description of the Related Art

As it is known, in order to compute one's position, a GNNS (global navigation satellite system) receiver, for example a GPS (Global Positioning System), receives properly formatted electromagnetic signals transmitted by a constellation of satellites orbiting the earth. While in theory determining location using GPS satellites is a simple process of triangulation, the reality is much more complex. First, the GPS receiver needs to find and "lock" onto enough satellites to be able to calculate its location, a process called acquisition. To calculate accurate position, however, the GPS receiver needs to know where each of these GPS satellites is in the sky with a very high degree of accuracy.

Every satellite takes 30 seconds to broadcast its precise location, and the GPS receiver is able to download these data from each satellite it needs for a fix (i.e. the computed user's position). These data, named ephemeris, describe a limited arc of orbit and are typically valid only for 2 to 3 hours. If anything interrupts the signal while receiving these data, such as a building or tree, the receiver has to wait another 30 seconds to completely download the data from the satellite.

In real-world conditions, where the GPS receiver is usually moving, it can take up to several minutes to obtain all the data the receiver needs to perform its calculations and obtain a fix, resulting in a long period with a great deal of location uncertainty before navigation can begin.

One possibility to mitigate the above problem is to autonomously generate internally to the receiver (i.e. the so called Portable Navigation Device, PND) the prediction of the satellite orbit on the basis of past downloaded ephemerides stored in the receiver memory. The autonomous satellite orbit prediction is becoming an important feature of a GNNS receiver.

The orbit of each satellite can be estimated by solving a classical celestial mechanics problem with an adequate level of knowledge about the overall forces (gravitational and non-gravitational) acting on the satellite and the so called Initial Condition (IC), meaning a satellite's position and velocity at a given time instant are available from present/past observations.

In theory a "perfect" knowledge (infinite precision) of the IC would be required to correctly solve the celestial mechanics problem. Any error in the initial conditions would generate an increasing in time position/velocity error. In practice only an initial condition with limited accuracy is available from a downloaded ephemeris. This is particularly true for the velocity. In addition to that it must be said that even the actual used transformation between ECEF (Earth Centered Earth Fixed) coordinates and the ECI (Earth Centered Inertial) coordinates might affect the accuracy of the initial condition value.

The transformation between ECEF and ECI coordinate systems includes in theory a number of different physical effects, the so called precession, nutation, polar motion effects and sidereal time calculation. For practical reasons, an autonomous system can only model all these effects with limited accuracy. The "true" data are in fact monitored and measured by the International Earth Rotation Service—IERS—which makes them available by means of periodic broadcasted bulletins. The consequence is that an implementable method for satellite orbit estimation includes a specific technique for the Initial Conditions Estimation.

Moreover, due to the limited computational capability of an embedded system, generally the implemented force models are only a limited subset of all the forces acting on an earth orbiting GNNS satellite. An exhaustive representation of the complete force models would be prohibitive for whatever commercial portable device. In addition to that there are forces which are known only to a limited level of accuracy. The consequence of these force models' inaccuracies is that the predicted satellite orbit will be affected by a position error generally growing in time (diverging error).

BRIEF SUMMARY

According to an embodiment, a satellite orbit prediction method of a satellite navigation system comprises:

storing satellite past ephemerides data associated with past time intervals and satellite recent ephemeris data associated with a recent time interval;

computing reference satellite positions based on the past and recent ephemerides data;

computing estimated satellite positions by propagating on the past time intervals a celestial mechanics force model employing said recent ephemeris data;

computing errors from said reference satellite positions and said estimate satellite positions; and identifying a position error function by fitting a curve to the said errors; and employing the position error function to obtain corrected predicted satellite orbit portions.

According to another aspect, a satellite orbit prediction module and a satellite receiver of satellite navigation system are described.

A further embodiment includes a satellite system, comprising a plurality of satellites configured to transmit signals and a receiving apparatus comprising:

a receiving module configured to receive satellite past ephemerides data associated with past time intervals and satellite recent ephemeris data associated with a recent time interval from a satellite of said plurality of satellites;

a memory storing the past ephemerides data and the recent ephemeris data;

a first computing module structured to compute reference satellite positions based on the past and recent ephemerides data;

an estimating module structured to estimate satellite positions by propagating on the past time intervals a celestial mechanics force model by employing said recent ephemeris data;

an error computing module configured to compute errors from said reference satellite positions and said estimate satellite positions;

a fitting module structured to identify a position error function by fitting a curve to the said errors.

BRIEF DESCRIPTION OF THE SEVERAL VIEWS OF THE DRAWINGS

Further characteristics and advantages will be more apparent from the following description of a preferred embodiment and of its alternatives given as a way of an example with reference to the enclosed drawings in which.

DETAILED DESCRIPTION

Figure 1:
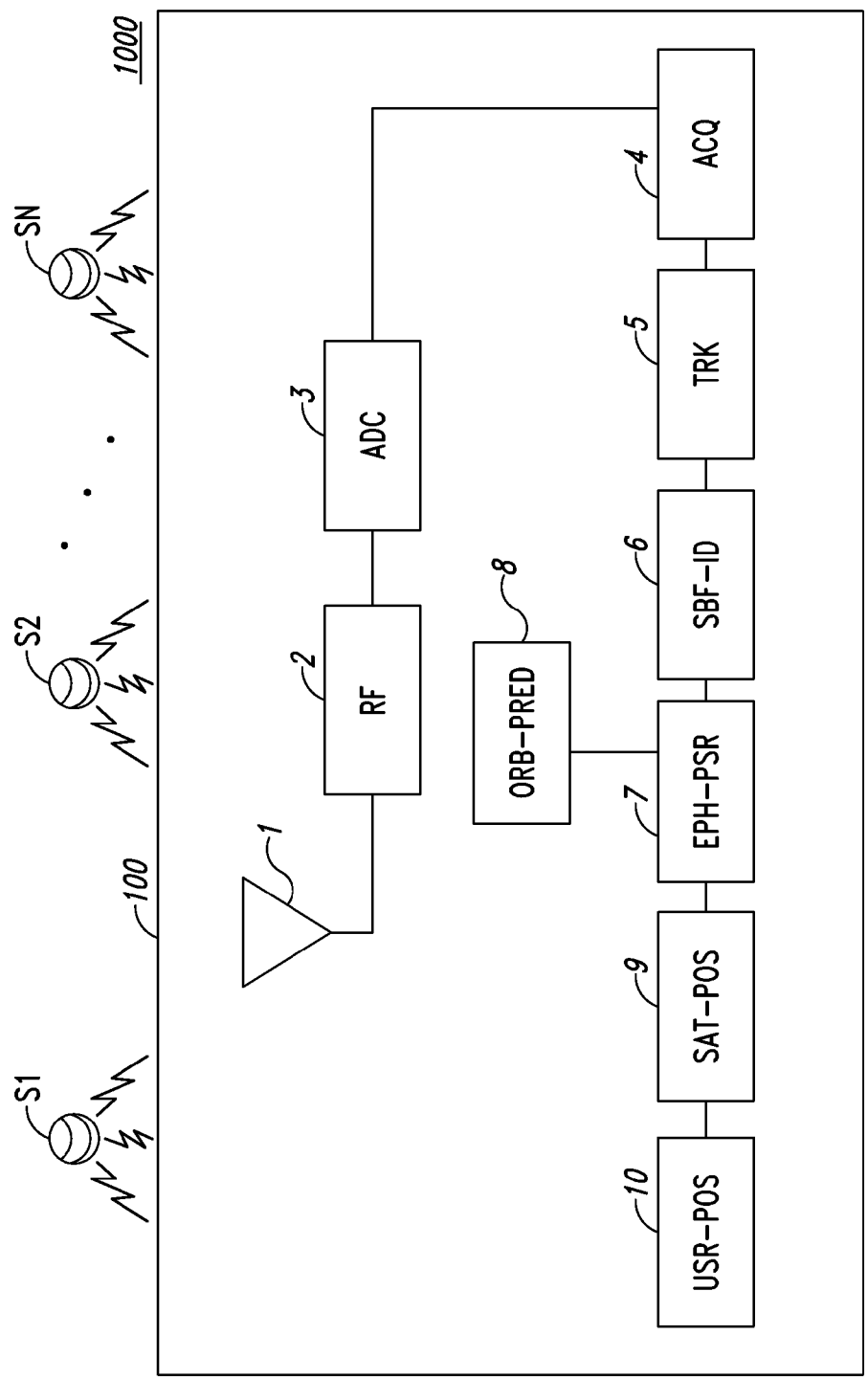
FIG. 1 schematically illustrates a global navigation satellite system according to an embodiment comprising a constellation of satellites and a receiving apparatus.

FIG. 1 schematically shows a GNSS system (global navigation satellite system) 1000 such as, for example the GPS System (Global Positioning System), the GLONASS System (Global'naya Navigatsionnaya Sputnikovaya Sistema), Galileo System or other kinds of positioning systems based on satellites. The global navigation satellite system 1000 comprises a constellation of S1-SN Satellites and at least a receiving apparatus 100.

As an example, the receiving apparatus 100 comprises an antenna 1, a radio frequency stage (RF) 2, and an analog-digital converter (ADC) 3, implementable through hardware modules. The receiving apparatus 100 further comprises an acquisition module (ACQ) 4, a tracking module (TRK) 5, a sub-frame identification module (SBF ID) 6, an ephemeris processing and pseudo-range computing module (EPH-PSR) 7, a satellite position computing module (SAT-POS) 9 and a user's position computing module (USR-PS) 10. Moreover, the receiving apparatus 100 is also provided with a satellite orbit prediction module 8 (ORB-PRED) to be activated in order to assist the ephemeris processing and pseudo-range module 7 and/or the satellite position computing module (SAT-POS).

For example the acquisition module 4 and the tracking module 5 can be implemented through hardware while the remaining modules from 6 to 10 can be implemented by means of a microprocessor or microcontroller programmed with respective software. The receiving apparatus 100 is provided with a central processing unit, memories (mass memory and/or work memory) and their interfaces (not shown in the figures) comprising a microprocessor or a microcontroller, for implementing the software-programmed modules.

Now, an example using GPS technology will be discussed, though what will be described hereinafter can be applied to other navigation/positioning satellite systems. When the receiving apparatus 100 is operating, the antenna 1 receives a plurality of signals from one or more satellites S1-SN of the satellite constellation operating in the 1000 system. For example, these signals are modulated on a 1.5 GHz carrier. Specifically each received signal carries first and second messages.

The first message carries a pseudo-random code, known as CA code, for example at 1 MHz, which is used to differentiate one satellite from another and which allows to measure the time when the signal was transmitted by the corresponding satellite.

The second message carries data (for example at a bit rate of 50 Hz) and in particular it is modulated according to the Bi-Phase Shift Keying technique (BPSK). Moreover the second message is hierarchically divided into frames and sub-frames and carries various information among which is a plurality of parameters to be used in determining the orbit and therefore the position of the satellite responsible for the first and second message transmission.

The radio frequency stage 2 operates on the signals received at the antenna 1 (analog type) and converts them in a base band. The converter 3 converts the analog base band signals into corresponding digital signals. The acquisition module 4 allows detecting, based on the digital output signals from the converter 3, which satellites in the S1-SN constellation are in sight, that is, for which satellites a signal suitable for identification is received.

Further the acquisition module 4 detects a plurality of parameters associated with the satellites and useful for their tracking over time. The tracking module 5 has several channels, each being allocated the signal of a different satellite.

Moreover, for each satellite and at any moment, in the tracking module 4, the Doppler frequency and the transmission length are computed and the bits of the second message carrying data are derived. The sub-frame identification module 6 decodes the various sub-frames of the second message of each received satellite by means of suitable algorithms. The ephemeris and pseudo-range module 7 stores the ephemeris for each satellite (derivable from the decoded sub-frames) and computes the distances between the satellites and the receiver 100 (such distance is called pseudo-range). From these computed values and through the transmission time, the satellite position computing module 9 computes the positions, expressed in 3D coordinates, of the satellites at the time of transmission. The satellite orbit prediction module 8 can be activated to assist the ephemeris processing and pseudo-range module 7 and/or the satellite position computing module when the ephemeris data are not available at the receiver apparatus 100.

The satellite position computing module 9 operates based on transmission time together with the receiving time (known by a clock inside the receiving apparatus 100) so as to evaluate how long the signal from each satellite took to reach the receiving apparatus 100 and thus evaluating the distance of the respective satellite (pseudo-range).

By means of a triangulation algorithm, the user's position computing module 10 computes the position of the receiving apparatus 100 from the known distances of the receiving apparatus 100 from, preferably, at least four satellites and the known positions of such satellites. Herein below the position of the receiving apparatus 100 (substantially coincident with the user's position) will be called "fix" according to the technical field.

Figure 2:
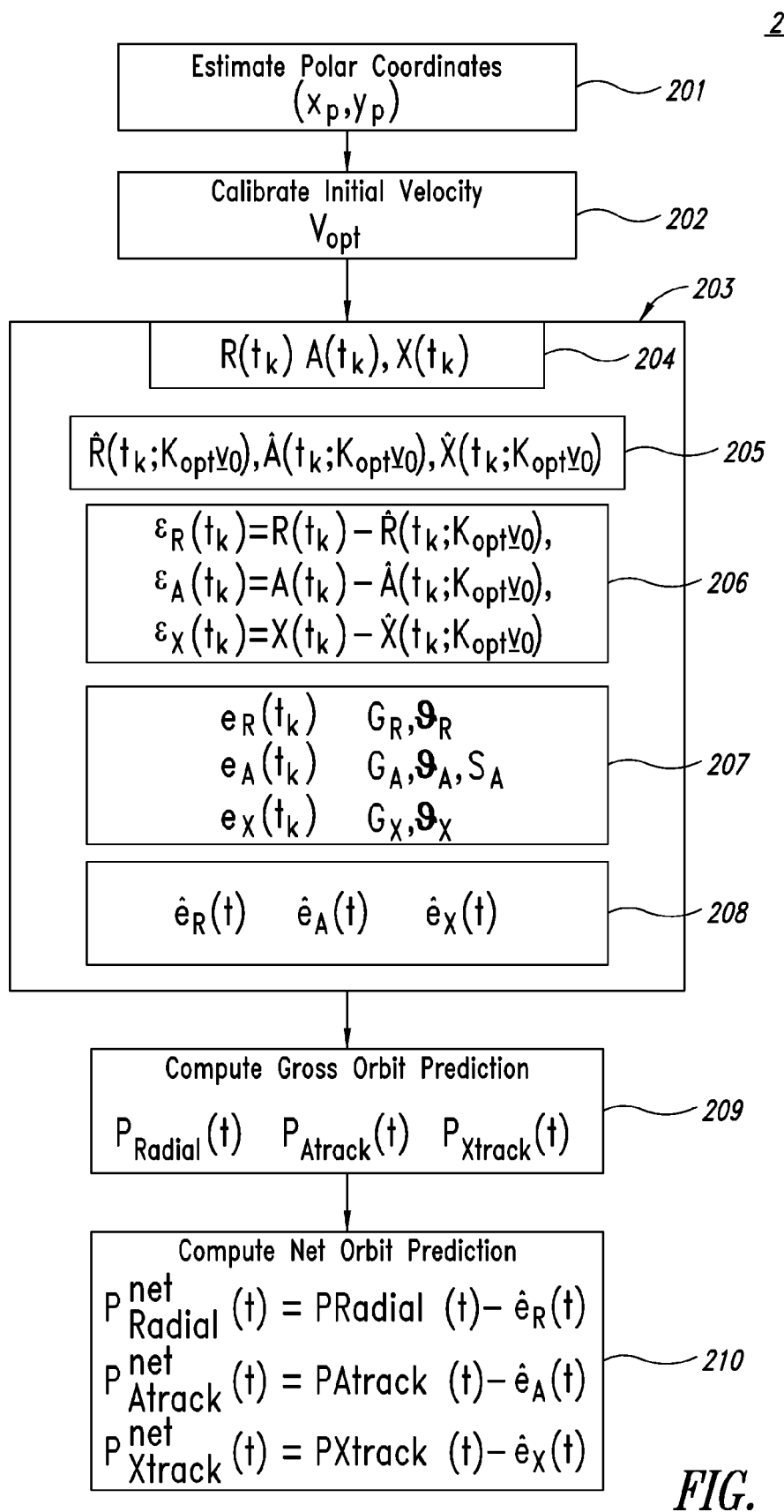
FIG. 2 shows by means of a flowchart an embodiment of a satellite orbit prediction method which can be employed in said receiving apparatus.

FIG. 2 shows an exemplary flowchart of a satellite orbit prediction method 200 which can be performed by the satellite orbit prediction module 8.

It is assumed that one or more ephemerides $Eph_1$, $Eph_2$, . . . $Eph_N$ from present and past observations are available and stored in the orbit prediction module 8. As it is known each ephemeris includes data describing a limited portion, i.e. an arc, of orbit, and is typically valid only for 2 to 3 hours. Each ephemeris belonging to the given set has a specific interval of validity $TV_j$ which is, for instance for the GPS system, approximately 4 four hours around the $t_{oe}$ (time of ephemeris). An overall interval TV is obtained as the union of all the validity intervals, that is $TV=TV_1 \cup TV_2 \cup \ldots TV_N$.

According to the example of FIG. 2, the satellite orbit prediction method 200 can include a polar coordinate estimation step 201, wherein an estimation of the earth polar coordinates $(x_p, y_p)$ to be used in the ECEF<->ECI coordinate system transformation is performed, and a calibrating step 202, wherein an initial satellite velocity $v_{opt}$ is determined. Moreover, it is observed that an initial satellite position is provided to the receiver apparatus 100 by the corresponding satellite S1-SN.

Satellite orbit prediction method 200 further comprises a position error estimation step 203, wherein predicted position error terms are estimated. Particularly, the predicted position error terms are defined along three specific coordinate system axes, the so called Radial, Along-Track and Cross-Track and will be referred to as $\hat{e}_R(t)$, $\hat{e}_A(t)$, $\hat{e}_X(t)$. Particularly, the error estimation step 203 includes a reference position computing step 204 wherein reference satellite positions, based on the past ephemerides data and on recent ephemeris (particularly, the most recent ephemeris, i.e. the current one) data available at the receiver apparatus 100, are computed. According to an example in said reference position computing step 204 the following (true) coordinate values in the overall TV interval are computed:

Radial $R(t_k)$, $t_k \in TV$ (1a)

Along-Track $A(t_k)$, $t_k \in TV$ (1b)

Cross-Track $X(t_k)$, $t_k \in TV$ (1c)

In a position estimation step 205 satellite positions are estimated by propagating on the past time intervals a celestial mechanics force model and by employing said recent ephemeris data. Particularly, in said position estimation step 205 a backward propagation of the coordinate values in the overall TV interval is performed so as to obtain the following coordinates:

Radial $\hat{R}(t_k;K_{opt},v_0)$, $t_k \in TV$ (2a)

Along-Track $\hat{A}(t_k;K_{opt},v_0)$, $t_k \in TV$ (2b)

Cross-Track $\hat{X}(t_k;K_{opt},v_0)$, $t_k \in TV$ (2c)

The backward propagation performed to obtain the coordinates of expression (2) can be, particularly, based on a celestial mechanics force model.

The fundamental mathematical/physical tool that will be extensively used in the description of the disclosure will be the so called Satellite Orbit Celestial Mechanics problem and correspondent solution. The position estimation step 205 can be approached as a classic Celestial Mechanics problem. Knowing the complete set of gravitational and non-gravitational force models $$\sum_{i=1}^{M} F_i(t, \underline{r}, \underline{v}) \qquad (2A)$$

acting upon the given satellite then, on the basis of Newton's law the problem can be stated as the following vectorial differential equation $$\underline{\ddot{r}} = \frac{\sum_{i=1}^{M} F_i(t, \underline{r}, \underline{v})}{m} \qquad (2B)$$

where $\underline{r}$, $\underline{v}$, $\underline{\ddot{r}}$ are respectively the position, velocity and acceleration vector.

The formal solution of the problem is $$\underline{r}(t) = \underline{r}_0 + \underline{v}_0 t + \frac{1}{m} \int_{t_0}^{t} \int_{t_0}^{t} \sum_{i=1}^{M} F_i(t, \underline{r}, \underline{v}) dt \qquad (2C)$$

where $\{\underline{r}_0, \underline{v}_0\}$ are respectively the initial position and velocity at $t_0$.

Particularly, a coordinates transformation (ECEF towards ECI) is made taking into consideration at least the polar motion phenomena and so employing the earth polar coordinates estimated in step 201. The backward propagation is performed by an integration of the force model which can be made according to standard numerical procedures such as the Runge-Kutta, Adam-Bashford or any other numerical algorithm. The backward" propagation of the force model is made considering that the variable t is in the past with respect $t_O$.

Moreover, in a computing error step 206 position error terms from said reference satellite positions and said estimate satellite positions are calculated. Particularly, in said computing error step 206 the following position error terms in the overall TV interval are computed as differences between expression (1) and (2):

Radial $\epsilon_R(t_k) = R(t_k) - \hat{R}(t_k;K_{opt},v_0)$, $t_k \in TV$ (3a)

Along-Track $\epsilon_A(t_k) = A(t_k) - \hat{A}(t_k;K_{opt},v_0)$, $t_k \in TV$ (3b)

Cross-Track $\epsilon_X(t_k) = X(t_k) - \hat{X}(t_k;K_{opt},v_0)$, $t_k \in TV$ (3c)

Then, each predicted errors term $\hat{e}_R(t)$, $\hat{e}_A(t)$, $\hat{e}_X(t)$ is estimated by determining a corresponding position error functions which fits a curve to the corresponding position errors terms: $\epsilon_R(t_k)$, $\epsilon_A(t_k)$, $\epsilon_X(t_k)$ (fitting step 207). Particularly, the position error functions can be defined by parametric models (preferred but not unique choice) by means of, as an example, an amplitude increasing sine-wave. According to an example, such parametric error functions can show the following forms:

$$\text{Radial}: e_R(t_k) = tG_R \sin\left(\frac{2\pi}{T}t_k + \vartheta_R\right) \qquad (4a)$$

$$\text{Along-Track}: e_A(t_k) = tG_A \sin\left(\frac{2\pi}{T}t_k + \vartheta_A\right) + S_A \qquad (4b)$$

$$\text{Cross-Track}: e_X(t_k) = tG_X \sin\left(\frac{2\pi}{T}t_k + \vartheta_X\right) \qquad (4c)$$

Wherein, $G_R$, $G_A$, and $G_X$ are amplitude parameters, $\theta_R$, $\theta_A$, $\theta_X$ are phase parameters and $S_A$ is a bias parameter. These parameters can be determined by selecting the values minimizing a quantity related to differences between each position errors terms $\epsilon_R(t_k)$, $\epsilon_A(t_k)$, $\epsilon_X(t_k)$ and the corresponding error functions $e_R(t_k)$, $e_A(t_k)$, $e_X(t_k)$. This quantity to be minimized can be a mean squared distance such as the one indicated by the expression (15) as it will be better clarified later with reference to FIG. 4.

The predicted position errors terms $\hat{e}_R(t)$, $\hat{e}_A(t)$, $\hat{e}_X(t)$ are then determined (step 208) by inserting in expressions (4) the values of the determined parameters, $G_R$, $G_A$, $G_X$, $\theta_R$, $\theta_A$, $\theta_X$ and $S_A$. It is observed that the position error terms $\hat{e}_R(t)$, $\hat{e}_A(t)$, $\hat{e}_X(t)$ have been estimated directly in the position domain and, particularly, without operating in the acceleration/force domain.

Moreover, in a gross prediction step 209 the "gross" satellite orbit along the Radial, Along-Track and Cross-Track axes $p_{Radial}(t)$, $p_{Atrack}(t)$, $p_{Xtrack}(t)$ is computed, e.g. by using the calibrated initial velocity $v_{opt}$ and numerically integrating the available force models on future time intervals and by employing, as an example, a numerical algorithm (e.g. Runge-Kutta, Adam-Bashford or any other numerical algorithm) equal to the one described with reference the position estimation step 205. The "forward" propagation of the force model is performed considering that the variable t is in the future with respect to $t_0$.

In a subsequent correction step 210, a final net/corrected orbit is computed by subtracting each estimated position error term from the corresponding gross satellite orbit term. Particularly, the corrected predicted orbits are expressed by the following formulas:

$$p_{Radial}^{net}(t) = p_{Radial}(t) - e_{Radial}(t) \quad (5a)$$

$$p_{Atrack}^{net}(t) = p_{Atrack}(t) - e_{Atrack}(t) \quad (5b)$$

$$p_{Xtrack}^{net}(t) = p_{Xtrack}(t) - e_{Xtrack}(t) \quad (5c)$$

The calculations to implement the satellite prediction method 200 above described can be performed in numerical manner. Moreover, the computing, estimating and fitting steps 201-210 can be performed by corresponding processing modules included into the satellite orbit prediction module 8 (FIG. 2). The corrected predicted orbits of expressions (5) can be used, in accordance with a specific embodiment, to compute ephemeris data to be provided to the ephemeris processing and pseudo-range module 7.

A particular embodiment of the polar coordinates estimation step 201 will be now described. This embodiment allows receiver apparatus 100 to autonomously estimate the earth polar coordinates $(x_p, y_p)$ relying only on the available set of broadcasted ephemerides. It can be demonstrated that the knowledge and inclusion of polar coordinates in the ECEF<->ECI coordinate system transformation makes the shape of the Along-Track position error of expression $\epsilon_A(t_k)$ well fitted by a simple mathematical curve model, and so suitable to be identified and subsequently cancelled.

There are several techniques for the polar coordinates estimation that can be used. One example is the estimation based on the Time Series Analysis of past data series of $(x_p, y_p)$ available from the IERS (International Earth Rotation Service). Among them one particularly promising technique is the Singular Spectrum Analysis (SSA). An estimation method that is completely autonomous and has no need for periodical updates/adjustments/tuning which is a common need for methods based on past data series will be described hereinafter. This polar coordinates estimation technique is based on the empirical observation that in the procedure of satellite orbit computation by means of force models integration, the inclusion in the ECEF<->ECI coordinate system transformation of the polar motion effect makes the Cross-Track satellite position error $\epsilon_X(t_k)$ curve well fitted by a simple mathematical curve model as it shows 1 (one) fundamental harmonic in it.

Figure 3A:
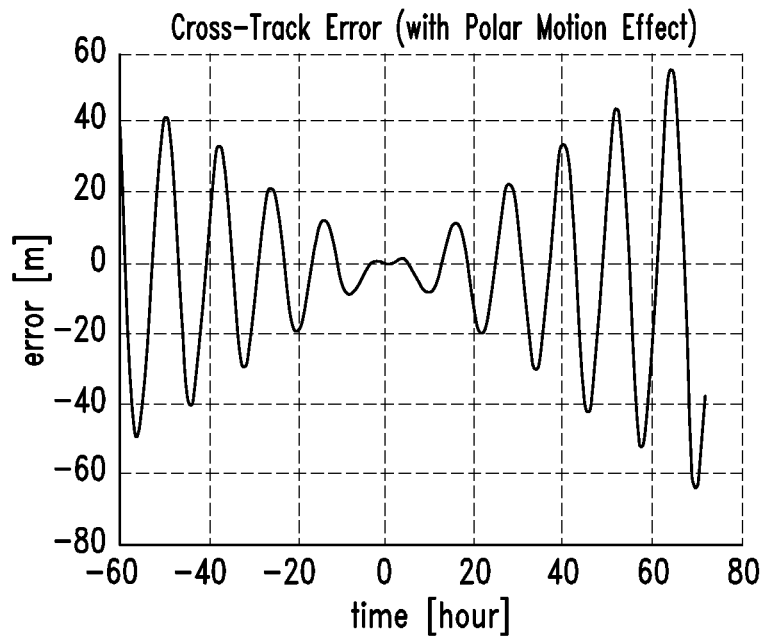
FIG. 3a shows a curve representing a cross-track error behavior obtained by a numerical simulation taking into account the polar motion effect.
Figure 3B:
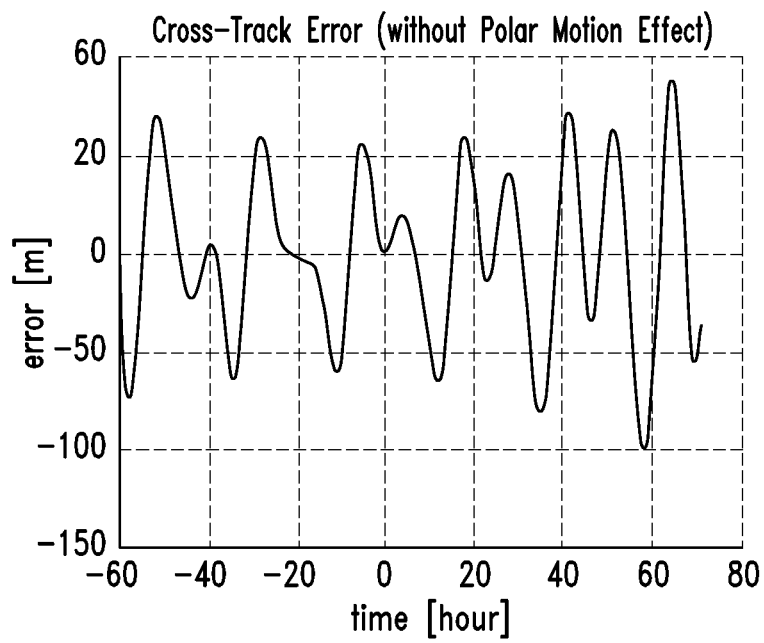
FIG. 3b shows another curve representing a cross-track error behavior obtained by a numerical simulation which does not take into account the polar motion effect.

On the contrary, removing the effect of the Polar Motion Coordinates, the Cross-Track satellite position error gets "distorted" and its mathematical model complicated by the simultaneous presence of multiple harmonic terms. FIG. 3*a* shows a simulation of the Cross-Track Error behavior obtained by considering the Polar Motion Effect and FIG. 3*b* shows a simulation of the Cross-Track Error behavior obtained without considering the Polar Motion Effect.

In accordance with the described embodiment, the polar coordinates estimation method 201 selects the coordinates couple $(x_p, y_p)$ that makes the Cross-Track satellite position error "as close as possible" to a predefined mathematical model. As an example, the mathematical model can be $$e_X(t) = G \cdot t \cdot \sin\left(\frac{2\pi}{T} t + \psi\right) \quad (6)$$

where T~12 hours and G and $\Psi$ are two parameters to be jointly identified together with $(x_p, y_p)$.

The above indicated selection of coordinates $(x_p, y_p)$ can be stated in mathematical form as an optimization problem. A Cross-Track Error Similarity Function (XESF) is defined as:

$$XESF(x_p, y_p, G, \psi) = \sum_{t_k \in TV} \left(\epsilon_X(t_k; x_p, y_p) - G \cdot t \cdot \sin\left(\frac{2\pi}{T} t_k + \psi\right)\right)^2 \quad (7)$$

that represents the "energy" of the distance between the computed Cross-Track Error $\epsilon_X(t_k)$ and the modeled one $e_X(t_k)$.

In the XESF expression, the quantity $$\epsilon_X(t_k; x_p, y_p) = X(t_k) - \hat{X}(t_k; x_p, y_p) \quad (8)$$

indicates the Cross-Track position error measurable within the overall TV interval. The first term $X(t_k)$ represents the true satellite orbit coordinates along the Cross-Track axis, computed from the available ephemeris set. The second term $\hat{X}(t_k; x_p, y_p)$ represents the estimated satellite orbit coordinates along the same axis, obtained by backward propagating the available force models, assuming $(x_p, y_p)$ as polar coordinates to be used in the ECEF<->ECI coordinate transformation and assuming as initial position and velocity conditions, values computed in ECEF coordinate from the most recent ephemeris $Eph_1$ and then transformed in the ECI coordinate system. The estimation of the polar coordinates $(x_p, y_p)$ is carried out by solving the 4-dimensional minimization of the XESF. The backward propagation can be made in a manner analogous to the one described with reference to the position estimation step 205.

Figure 4:
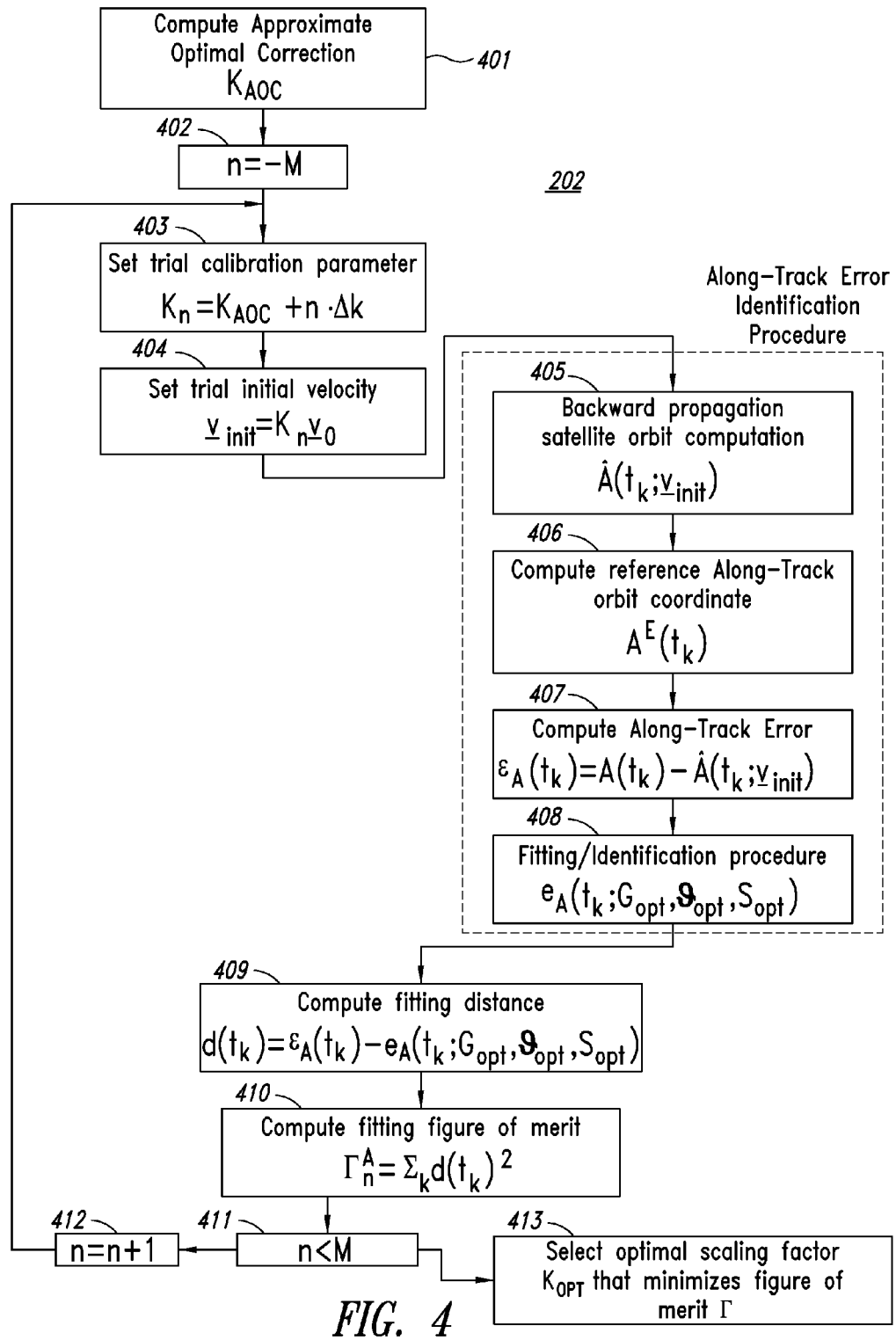
FIG. 4 shows by means of a flowchart an embodiment of initial velocity computing procedure which can be employed by said orbit prediction method.

FIG. 4 shows a flow chart representing an embodiment of the calibrating step 202, wherein an initial satellite velocity $v_{opt}$ is determined. This embodiment of the calibrating step 202 allows to jointly estimate the initial satellite velocity $v_{opt}$ and the along-track parametric error functions $e_A(t_k)$ indicated by expression (4b). Therefore part of the computing performed in the calibrating step 202 gives results that avoid further computation steps in the position error estimation step 203.

Calibrating step 202 comprises an approximate correction computing step 401 wherein the calculation of a specific scaling factor $K_{AOC}$ of the initial velocity vector computed from the most recent ephemeris $Eph_1$ is performed. That scaling factor $K_{AOC}$ is determined according to an Approximated Optimal Correction (AOC) approach. A vector $v_0 = [v_0^x \ v_0^y \ v_0^z]$ represents the initial velocity computed from the most recent ephemeris $Eph_1$.

The scalar factor $K_{AOC}$ can be determined applying the following criterion: $K_{AOC}$ is the velocity scaling factor that applied to the ephemeris initial velocity $v_0$, minimizes the overall mean squared Radial Position Error within the $TV_1$ interval.

So, ideally, $K_{AOC}$ is the solution of the optimization problem stated below $$K_{AOC} = \arg\left\{\min_K \sum_{t_k \in TV_1} (R^E(t_k) - \hat{R}(t_k; K\underline{v}_0))^2\right\} \quad (9)$$

where $R^E(t_k)$ are the "reference" radial coordinate values computed from the available most recent ephemeris, while $\hat{R}(t_k;K\underline{v}_0)$ are the radial coordinate values obtained backward propagating the available force models, assuming $K\underline{v}_0$ as initial velocity. The backward propagating can be performed in a manner analogous to the one described with reference to the position estimation step 205.

To actually solve the optimization problem stated above, the correction computing step 401 can proceed as follow. In the interval $TV_1$ the estimated satellite radial coordinate values $\hat{R}(t_k;K\underline{v}_0)$ are computed by backward propagating the available force models, with $K_0=1$, then with $K_1=1+\delta K$, where $\delta K$ is an arbitrary, sufficiently small quantity. So whatever is the scaling factor K, correction computing step 401 includes a step of approximately computing the related radial coordinate evolution for the backward-predicted satellite orbit as follows (Taylor-Series-like expansion)

$$\hat{R}(t; K\underline{v}_0) \cong \hat{R}(t; \underline{v}_0) + \frac{\hat{R}(t; K_1\underline{v}_0) - \hat{R}(t; \underline{v}_0)}{\delta K}(K - K_0) \quad (10)$$

By employing the Taylor-Series-like expansion of expression (10) in practice only two different backward propagations (one with $K_0=1$ and another with $K_1=1+\delta K$) are performed to compute the optimum scaling factor. Therefore, the need of computing the result of the backward propagation for a greater number of different values of the scaling factor is avoided.

Substituting the above equations (10) in the optimization problem it can be easily proven that the solution is given by the following expression $$K_{OAC} = \quad (11)$$

$$-\frac{\sum_{t_k \in TV_1}\left(R^E(t_k) - \hat{R}(t_k; \underline{v}_0)\right) \cdot \left(\hat{R}(t_k; K_1\underline{v}_0) - \hat{R}(t_k; \underline{v}_0)\right)}{\sum_{t_k \in TV_1}\left(\hat{R}(t_k; K_1\underline{v}_0) - \hat{R}(t_k; \underline{v}_0)\right)^2} \cdot \delta K + K_0$$

A next algorithm of the calibrating step 202 is directed to refining the scaling parameter $K_{AOC}$ preliminary estimated. The purpose of this refining algorithm is to determine a final scalar parameter $K_{OPT}$ that allows performing the position error estimation step 203 (FIG. 2) in a separate and parallel estimation procedure according to predefined parametric mathematical models.

As an example, the algorithm for the refinement phase is based on the evaluation of the Along-Track Position Error for each amplification parameter $K_n$ belonging to a predefined set of trial values around scaling factor $K_{AOC}$, across the available overall observation interval TV. The set of discrete and finite values is defined as follow (steps 402 and 403 in FIG. 4):

$$K_n = K_{AOC} + n \cdot \Delta K \text{ with } n \in \{-M, -M+1, -M+2, \ldots -1, 0, +1, +2, \ldots M-1, M\}. \quad (12)$$

In the equation (12) above $\Delta K$ is a suitable and sufficiently small step size, while M defines the width of the spanned interval $2 \cdot M \cdot \Delta K$ (around $K_{AOC}$) and so are selected such that 'statistically' in the majority of the cases the algorithm can be successfully performed.

In an initialization step 404 an initial velocity $v_{init}=K_n\underline{v}_0$ is assumed. In a computation step 405 along-track coordinate values $\hat{A}(t_k;K_n\underline{v}_0)$ are obtained by a backward propagation of the available force models starting from the initial conditions. Moreover, in a further computation step 406 "reference" along-track coordinate values $A^E(t_k)$ are computed employing the available set of ephemerides.

For a given trial value $K_n$ the Along-Track Position Error (ATPE)

$$\epsilon_A(t_k) = A(t_k) - \hat{A}(t_k;K_n\underline{v}_0) \quad (13)$$

for the backward-predicted satellite orbit is computed (step 407).

Then, assuming a predefined mathematical parametric model, a curve fitting procedure (i.e. an identification procedure) is carried out on the specific ATPE "curve" $\epsilon_A(t_k)$. According to an example, the following mathematical 3-parameter model is defined (step 408) for the Along-Track error:

$$e_A(t; G, \vartheta, S) = G_A \cdot t \cdot \sin\left(\frac{2\pi}{T}t + \vartheta_A\right) + S_A \quad (14)$$

In the above mathematical model, $G_A$ is the amplitude of an in-time linearly increasing sinewave, $\theta_A$ is the sinewave phase, and finally $S_A$ is a bias or offset.

The curve fitting procedure performs a joint estimation of those three parameters such that the fitting is the best according to a given criterion. According to a particular example, a criterion is to minimize a quantity depending on a distance $d(t_k)$ between the "measured" ATPE $\epsilon_A(t_k)$ and the "modeled" one $e_A(t_k)$ $$d(t_k) = \epsilon_A(t_k) - e_A(t_k; G_{opt}, \theta_{opt}, S_{opt}) \quad (15)$$

Particularly, such quantity to be minimized in a minimizing step 409 can be the mean squared distance between the measured ATPE $\epsilon_A(t_k)$ and the modeled one $e_A(t_k)$ The problem can be stated in mathematical form as follow:

$$\{G_{opt}, \vartheta_{opt}, S_{opt}\} = \arg\left\{\min_{\{G,\vartheta,S\}}\sum_{t_k \in TV}(\varepsilon_A(t_k) - e_A(t_k; G, \vartheta, S))^2\right\} \quad (16)$$

Wherein, the triplet $G_{opt}, \theta_{opt}, S_{opt}$ corresponds to the parameters satisfying the above criterion.

To quantify the goodness of the fitting result for the given trial value $K_n$, once the optimization has been solved, the step 202 can compute (step 410) a figure of merit $\Gamma_n^A$, which is the mean squared distance corresponding to the triplet $\{G_{opt}, \theta_{opt}, S_{opt}\}$, that is $$\Gamma_n^A = \sum_{t_k \in TV}(\varepsilon_A(t_k) - e_A(t_k; G_{opt}, \vartheta_{opt}, S_{opt}))^2 \quad (17)$$

The procedure described above is performed for each trial value $\{K_{-M}, K_{-M+1}, K_{-M+2}, \ldots K_{-1}, K_0, K_1, K_2, \ldots K_{M-1}, K_M\}$, assuming n=n+1 (step 412) and n=−M (step 402), until the condition n<M is satisfied ("if" step 411).

So a corresponding finite set of figure of merit values is obtained $$\{\Gamma_{-M}^A, \Gamma_{-M+1}^A, \Gamma_{-M+2}^A, \ldots \Gamma_{-1}^A, \Gamma_0^A, \Gamma_1^A, \Gamma_2^A, \ldots \Gamma_{M-1}^A, \Gamma_M^A\}. \quad (18)$$

The optimal scaling factor within the set $\{K_n\}$ is chosen as the one that minimizes the figure of merit $\Gamma_n^A$ (selection step 413). The optimal scaling factor parameter has been selected and therefore the best initial velocity $(K_{opt}, \underline{v}_0)$ has been determined. It is observed that the computing, estimating and selecting steps 401-413 can be performed by corresponding processing modules included into the satellite orbit prediction module 8 (FIG. 2). It is also noticed that, with reference to the optimizations problems expressed by formula (7) and formula (13), an approach analogous to the one of formula (10) which has been applied to solve the optimization problem of expression (9) can be employed. Formula (7) refers to an optimization problem concerning the selection of coordinates $(x_p, y_p)$ made to compute the quantity XESF. Formula (13) refers to the optimization calculation of parameter Kn made to compute the quantity Along-Track Position Error (ATPE).

In both cases, the computing of a backward propagation for a number of different values of the same parameters can be avoided by expressing the quantity to be computed by means of a Taylor-Series-like expansion based on only two different values of the parameters involved $((x_p, y_p)$ or Kn), analogously to the above shown expression (10). In this way, only two different backward propagations are used to compute whatever parameter dependent backward propagation.

The optimization problem can be expressed in a generic form as follow: p is the parameter to be adjusted for the optimization and X(t;p) is a quantity to be computed (e.g. a position error or a position coordinate). The estimated quantities are computed by backward propagating the available force models, with parameter p equal to an initial value $p_0$, then with the parameter p equal to a slightly modified value $p_0 + \Delta p$:

$X(t; p_0)$ $X(t; p_0 + \Delta p)$

To get the result of the backward propagation the following formula, that resemble the first order Taylor series expansion formula, can be applied:

$$X(t; p) = X(t; p_0) + \frac{X(t; p_0 + \Delta p) - X(t; p_0)}{\Delta p}(p - p_0) \quad (45)$$

It is noticed that the described satellite orbit prediction method 200 computing position error terms $\hat{e}_R(t)$, $\hat{e}_A(t)$, $\hat{e}_X(t)$ directly in the position domain and, particularly, without operating in the acceleration/force domain, and taking into account a forces model offer satisfying accuracy and is not excessively complex allowing the implementation in the receiver apparatus 100. Moreover, the above described procedure for initial satellite velocity computation allows determining initial conditions in an accurate manner which positively affects the whole orbit prediction method.

While this detailed description has set forth some embodiments, the appended claims cover other embodiments which differ from the described embodiments according to various modifications and improvements.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A satellite orbit prediction method of a satellite navigation system, comprising:
   storing satellite past ephemerides data associated with past time intervals and satellite further ephemeris data associated with a further time interval, the further ephemeris data being obtained more recently than the past ephemerides data;
   computing reference satellite positions based on the past and further ephemerides data;
   computing estimated satellite positions by propagating on the past time intervals using a celestial mechanics force model and said further ephemeris data;
   computing errors from said reference satellite positions and said estimated satellite positions; and
   identifying a position error function by fitting a curve to the errors; and
   obtaining corrected predicted satellite orbit portions by employing the position error function.

2. The method according to claim 1, wherein the reference satellite positions and estimated satellite positions are expressed according to the following coordinates: Radial, Along-Track and Cross-Track.

3. The method according to claim 1, wherein identifying the position error function comprises:
   defining a parametric curve associated with at least a parameter; and
   determining the at least a parameter by minimizing a difference between said errors and the parametric curve so as to define said position error function.

4. The method according to claim 3, wherein said parametric curve is an amplitude-increasing sinewave and the at least a parameter includes: an amplitude factor, a phase term and a bias term.

5. The method according to claim 1, wherein employing the position error function comprises:
   computing predicted satellite orbit portions from said celestial mechanics force model; and
   computing the corrected predicted satellite orbit portions from the predicted satellite orbit portions and the position error function.

6. The method according to claim 5, further comprising:
   estimating earth polar coordinates; and
   estimating satellite initial velocity and an initial satellite position.

7. The method according to claim 6, wherein:
   computing the reference satellite positions, the estimated satellite positions, and the predicted satellite orbit portions further include:
   employing said satellite initial velocity.

8. The method according to claim 6, wherein the reference satellite positions and estimated satellite positions are expressed according to the following coordinates: Radial, Along-Track, and Cross-Track; and estimating the initial satellite velocity comprises:
   estimating a first satellite velocity amplitude by employing radial coordinate values of the satellite position;
   computing along-track satellite coordinate errors; and
   refining said first velocity satellite amplitude to obtain the initial velocity by employing said along-track satellite coordinate errors.

9. The method according to claim 8, wherein computing along-track satellite coordinate errors comprises:

computing estimated satellite along-track coordinates by propagating on the past time intervals the celestial mechanics force model by employing said further ephemeris data and the first satellite velocity amplitude;

computing reference satellite along-track coordinates based on the past and further ephemerides data;

calculating the along-track satellite coordinate errors from said reference satellite along-track coordinates and said estimate satellite along-track coordinates.

10. The method according to claim 9, where refining said first velocity comprises:

identifying an along-track position error function by fitting a curve to said along-track satellite coordinate errors; and selecting a velocity amplitude factor by minimizing a quantity associated with a distance between said along-track satellite coordinate errors and the along-track position error function.

11. The method according to claim 10, wherein said quantity being minimized is a mean squared distance obtained from the along-track satellite coordinate errors and an along-track coordinate error function.

12. The method of claim 8, wherein estimating a first satellite velocity amplitude by employing radial coordinate values of the satellite position includes:

defining an optimization problem based on a first value of an optimization parameter and a second value of the optimization parameter, calculating a first radial coordinate value associated with the first value of an optimization parameter employing said celestial mechanics force model, calculating a second radial coordinate value associated with the second value of the optimization parameter employing said celestial mechanics force model, expressing a radial coordinate prediction function as a first order Taylor series computed from said first radial coordinate value and second radial coordinate value;

determining said radial coordinate values of the satellite position from the radial coordinate prediction function.

13. The method according to claim 6, wherein estimating earth polar coordinates comprises:

computing reference satellite cross-track coordinates based on the past and further ephemerides data;

computing estimated satellite cross-track coordinates by propagating on the past time intervals the celestial mechanics force model by employing said further ephemeris data;

calculating cross-track satellite coordinate errors from said reference satellite cross-track coordinates and said estimate satellite cross-track coordinates;

identifying a cross-track position error function by fitting a curve to said cross-track satellite coordinate errors; and selecting the earth polar coordinates by minimizing a quantity associated with a distance between said cross-track satellite coordinate errors and the cross-track position error function.

14. A satellite orbit prediction module for a satellite receiver, comprising:

a memory configured to store satellite past ephemerides data associated with past time intervals and satellite further ephemeris data associated with a further time interval;

a first computing module structured to compute reference satellite positions based on the past and further ephemerides data;

an estimating module structured to estimate satellite positions by propagating on the past time intervals using a celestial mechanics force model and said further ephemeris data;

an error computing module configured to compute errors from said reference satellite positions and said estimated satellite positions; and a fitting module structured to identify a position error function by fitting a curve to the said errors.

15. The module of claim 14, further comprising:

a prediction module structured to predict satellite orbit portions from said celestial mechanics force model; and a correction module structured to correct the predicted satellite orbit portions from the predicted satellite orbit portions and the position error function.

16. The module of claim 14, wherein the fitting module is structured to:

define a parametric curve associated with at least a parameter; and determine the at least a parameter by minimizing a difference between said errors and the parametric curve so as to define said position error function.

17. The module of claim 14, further comprising:

a second computing module configured to estimate earth polar coordinates based on a polar motion effect; and a third computing module configured to estimate a satellite initial velocity.

18. A receiving apparatus for a satellite navigation system, comprising:

a receiving module configured to receive, from a satellite, satellite past ephemerides data associated with past time intervals and satellite further ephemeris data associated with a further time interval;

a memory configured to store the past ephemerides data and the further ephemeris data;

a first computing module structured to compute reference satellite positions based on the past and further ephemerides data;

an estimating module structured to compute estimated satellite positions by propagating on the past time intervals using a celestial mechanics force model and said further ephemeris data;

an error computing module configured to compute errors from said reference satellite positions and said estimated satellite positions; and a fitting module structured to identify a position error function by fitting a curve to the errors.

19. The apparatus of claim 18, further comprising:

a prediction module structured to predict satellite orbit portions from said celestial mechanics force model; and a correction module structured to correct the predicted satellite orbit portions from the predicted satellite orbit portions and the position error function.

20. The apparatus of claim 19, further comprising:

an ephemeris and pseudo-range module configured to store the corrected predicted satellite orbit portions provided by the correction module;

a satellite position computing module structured to evaluate a distance of the respective satellite from the apparatus by employing said predicted satellite orbit portions;

an apparatus position computing module configured to employ said distance and further distances associated with further satellites to compute a position of the apparatus.

21. The apparatus of claim 18, wherein the fitting module is structured to:

define a parametric curve associated with at least a parameter;

determine the at least a parameter by minimizing a difference between said errors and the parametric curve so as to define said position error function.

22. A satellite system, comprising:

a plurality of satellites configured to transmit signals;

a receiving apparatus including:

a receiving module configured to receive, from a satellite of said plurality of satellites, satellite past ephemerides data associated with past time intervals and satellite further ephemeris data associated with a further time interval;

a memory configured to store the past ephemerides data and the further ephemeris data;

a first computing module structured to compute reference satellite positions based on the past and further ephemerides data;

an estimating module structured to compute estimated satellite positions by propagating on the past time intervals using a celestial mechanics force model and said further ephemeris data;

an error computing module configured to compute errors from said reference satellite positions and said estimated satellite positions; and a fitting module structured to identify a position error function by fitting a curve to the said errors.

23. The system of claim 22, wherein the fitting module is structured to:

defining a parametric curve associated with at least a parameter;

determining the at least a parameter by minimizing a difference between said errors and the parametric curve so as to define said position error function.

* * * * *